UNITED STATES PATENT OFFICE.

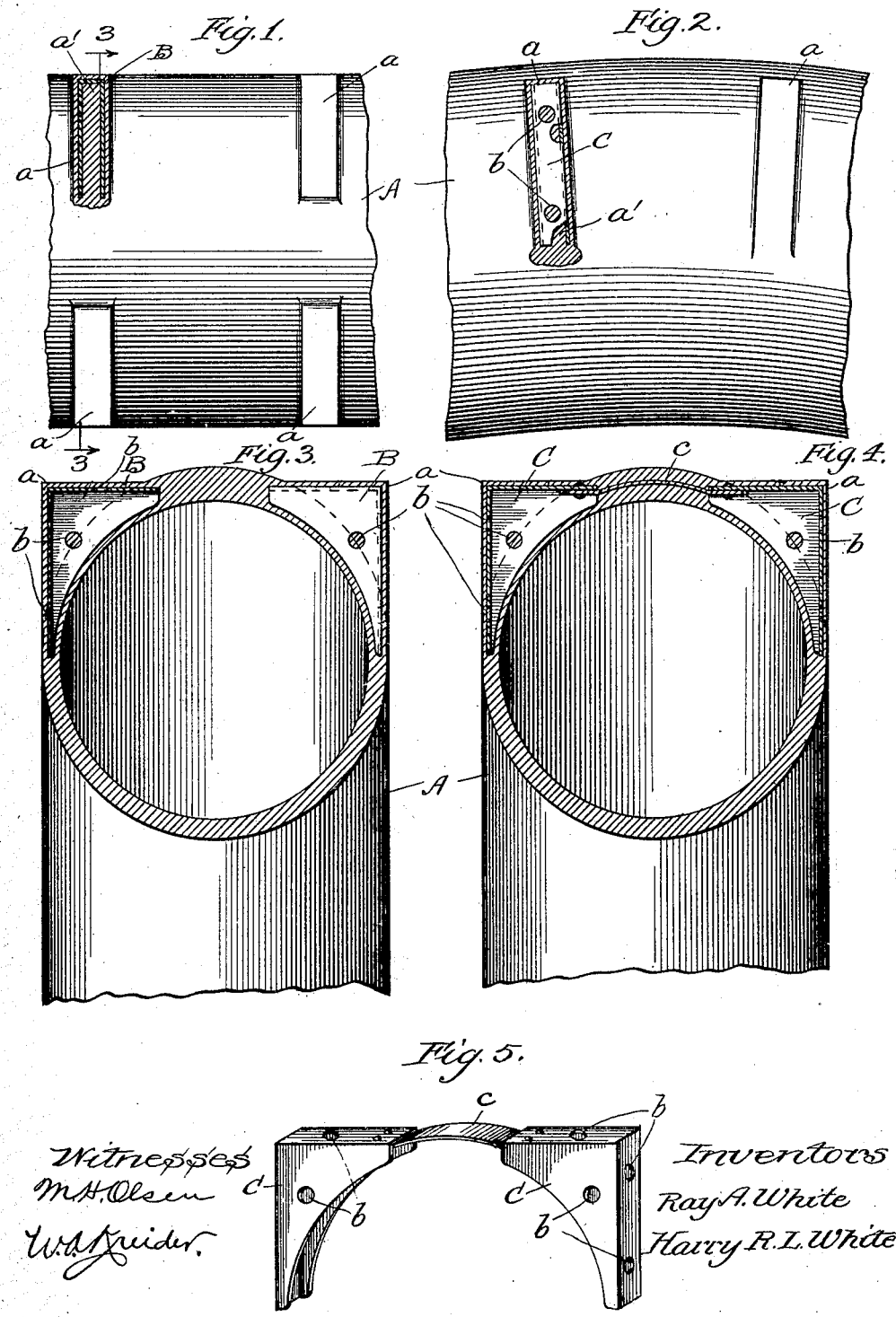

RAY A. WHITE AND HARRY R. L. WHITE, OF CHICAGO, ILLINOIS.

VEHICLE-TIRE.

No. 871,545.

Specification of Letters Patent.

Patented Nov. 19, 1907.

Application filed June 25, 1906. Serial No. 323,192.

*To all whom it may concern:*

Be it known that we, RAY A. WHITE and HARRY R. L. WHITE, citizens of the United States, and residents of the city of Chicago, in the county of Cook and State of Illinois, have invented certain new and useful Improvements in Vehicle-Tires; and we do hereby declare that the following is a full, clear, and exact description of the same, reference being had to the accompanying drawings, and to the letters of reference marked thereon, which form a part of this specification.

This invention relates to improvements in vehicle tires and more particularly to a non-skidding resilient tire.

Heretofore a great many devices have been resorted to, to enable the tire to obtain a firm grip upon the road-bed, to prevent the vehicle from skidding, but many of them have been too costly to come into general use. Furthermore, many of the devices used for this purpose, while possessing sufficient gripping qualities, have not been able to withstand the hard usage to which they are subjected.

The object of this invention is to provide a vehicle tire capable of engaging the road-bed with great tenacity and at the same time adapted to withstand the great strain to which it is subjected without decreasing its efficiency.

It is a further object of the invention to provide a tire having means thereon adapted to prevent its skidding, and which is reinforced to give it better lasting qualities.

In the drawings: Figure 1 is a fragmentary top plan view, partly in section, of a device embodying our invention; Fig. 2 is a fragmentary side elevation of the same, showing one of the reinforced members in end elevation and partly broken; Fig. 3 is a section taken on line 3—3 of Fig. 1; Fig. 4 is a view similar to Fig. 3, but showing a slight modification, and Fig. 5 is a perspective view of the reinforcing means shown in Fig. 4.

As shown in said drawings: A represents a tubular vehicle tire which may be of any preferred material and construction and which, as shown, is provided with a thickened tread as is usual in such devices.

For the purpose of providing an efficient gripping surface, the tire is provided on each side of its outer periphery and slightly below the same with a plurality of lugs or bosses $a$ of any preferred size and shape and arranged thereon in any desired manner, but, as shown, said lugs are arranged oppositely and are rectangular on their outer faces to provide broad gripping faces at approximately right angles to the tread and adapted to lie flat on the road surface. Said lugs $a$ extend radially of the tire to approximately its medial line and molded within the same are reinforcing members or braces B, which may be of any preferred material and construction, but as shown are of cast or stamped metal, and the outer sides thereof conform to, or are parallel with, the outer sides of said lugs, and the inner sides thereof, or those adjacent the tire, conform to the curvature of the tire. Said reinforcing members may be of solid metal having apertures $b$ therein, in which the tire material bonds in molding, but, as shown, said members are hollow and open on their inner faces and within the same is a core $a^1$ of rubber or other tire material integral with the tire and which completely fills the same as shown more clearly in Figs. 1 and 2.

If preferred, and as shown in Figs. 4 and 5, the reinforcing members C—C, on opposite sides of the tire, may be connected by a resilient strip of metal $c$, which is rigidly engaged at its ends to said members and is curved outwardly to conform to the transverse curvature of the tread in which it is embedded. Said strip $c$ provides a greater bearing surface for said members against inward thrust and acts to greatly stiffen the lugs.

The operation is as follows: When the tire is in use upon a vehicle the gripping lugs $a$ engage the road surface and provide a relatively broad bearing and in case the vehicle attempts to skid said lugs tend to impinge against the road surface and prevent such action. The reinforcing members in the lugs act to stiffen them and cause them to engage the road with greater force and add greatly to their lasting qualities and inasmuch as the tire material bonds therein they are prevented from displacement should the lugs become torn or broken from any cause.

While we have shown the lugs arranged oppositely on the tire, it is obvious that they may be arranged in any preferred manner and may be of any preferred size and shape.

We claim as our invention:

1. In a device of the class described the combination with a tire body of a plurality of transverse lugs thereon and an individual reinforcing member in each lug.

2. In a device of the class described the combination with a tire body of a plurality of lugs on the tread surface thereof and an individual reinforcing member molded in each lug and recessed on its inner side to receive the tire material.

3. A vehicle having outwardly directed lugs on its tread surface and an apertured reinforcing member bonded in each lug.

4. In a vehicle tire the combination with a tire body having a plurality of outwardly directed lugs thereon, of a hollow reinforcing member molded in each lug.

5. In a device of the class described, the combination with a tire body of a plurality of lugs on the tread surface thereof, and a hollow reinforcing member molded in each lug and shaped on its inner face to conform to the curvature of the tire.

6. In a device of the class described, the combination with a tire body having a plurality of lugs on its outer periphery, of a hollow reinforcing member molded in each lug and filled with the tire material and means connecting oppositely disposed members together.

7. In a vehicle tire the combination with the tire body of oppositely disposed transverse lugs on the tread surface thereof, metallic reinforcing members in said lugs, and resilient means embedded in the tire and connecting the reinforcing members in oppositely disposed lugs.

8. In a tire of the class described the combination with a tire body having a plurality of oppositely disposed, transverse lugs on its tread surface, of a hollow reinforcing member in each lug and a metallic strip connecting the members in oppositely disposed lugs.

In testimony whereof, we have signed our names to this specification in the presence of two subscribing witnesses.

RAY A. WHITE.
HARRY R. L. WHITE.

Witnesses:
M. H. OLSEN,
CARRIE E. JORDAN.